Nov. 23, 1954 M. KAPPLER 2,694,987
DIE FOR SIMULTANEOUSLY STAMPING OUT AND
SEALING FILLED PASTRY GOODS OR THE LIKE
Filed July 11, 1950 2 Sheets-Sheet 1

Inventor
M. Kappler
By
Attys.

Inventor
M. Kappler

United States Patent Office 2,694,987
Patented Nov. 23, 1954

2,694,987

DIE FOR SIMULTANEOUSLY STAMPING OUT AND SEALING FILLED PASTRY GOODS OR THE LIKE

Max Kappler, Uebersee, Germany

Application July 11, 1950, Serial No. 173,097

Claims priority, application Germany July 26, 1949

5 Claims. (Cl. 107—47)

The invention relates to a stamping out and sealing die for substances such as filled pastry or similar plastic masses, for example marzipan.

According to the invention, a pressure edge is provided within the stamping out and sealing die at a distance from the stamping out edge in such manner that, when stamping out, the edges of the two pastry layers, which lie one on the other, are pressed together.

When using this new stamping out and sealing die, it is, therefore, possible to stamp out by a single pressure of the hand the shape of tarts, fritters, pies, filled pastry, dough nuts and the like, together with their fillings and to seal them at the pastry edges at the same time.

In a particularly advantageous construction, the new stamping out and sealing die consists of a cup comprising a tubularly formed projection serving as a handle, the stamping out and sealing die thus forming at the same time a funnel which would have many uses.

The invention is diagrammatically illustrated by way of example in the accompanying drawing, in which.

Figure 1:
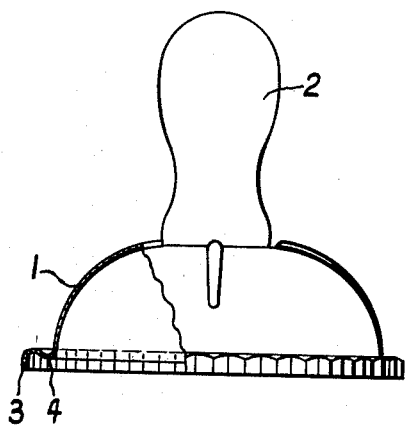
Figure 1 is a side elevation of a stamping out and sealing die, partly in section.
Figure 2:
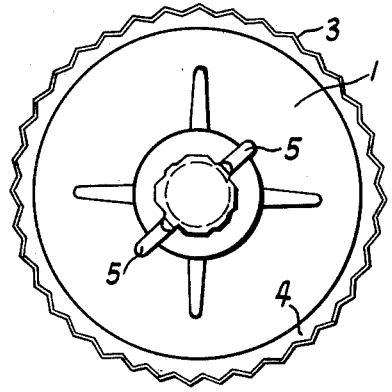
Figure 2 is a corresponding plan view from below.
Figure 6:
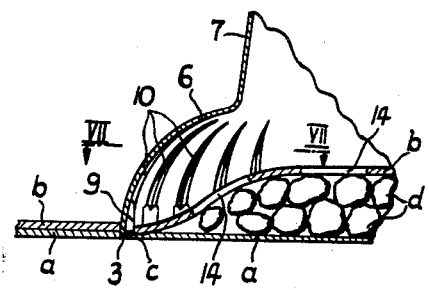
Figure 6 is a part sectional view illustrating the operation of the die.
Figure 7:
Figure 7 is a sectional view of the reinforcing ribs.

The stamping out and sealing die illustrated in Figures 1 and 2 consists of a cup 1 advantageously made of tinned sheet metal. A handle 2, of wood or the like, is secured to the cup. As shown in the drawings, particularly in Figure 2, the stamping out edge may be toothed or corrugated, and for the rest may be of any desired basic shape, for example circular (as shown), elliptical, angular, star-shaped, or the like.

According to the invention, a pressure edge is provided, at a distance from the stamping out edge, which effects the sealing of the pastry edges. In the construction according to Figures 1 and 2, this pressure edge consists of a circular seam.

Furthermore, air holes are advantageously provided in the cup 1. For this purpose, seams 5 are pressed into the upper part of the cup to form an air channel which connects the inside of the cup with the outer air for the purpose of avoiding the formation of too high or too low pressure in the cup during the stamping-out operation.

Figure 3:
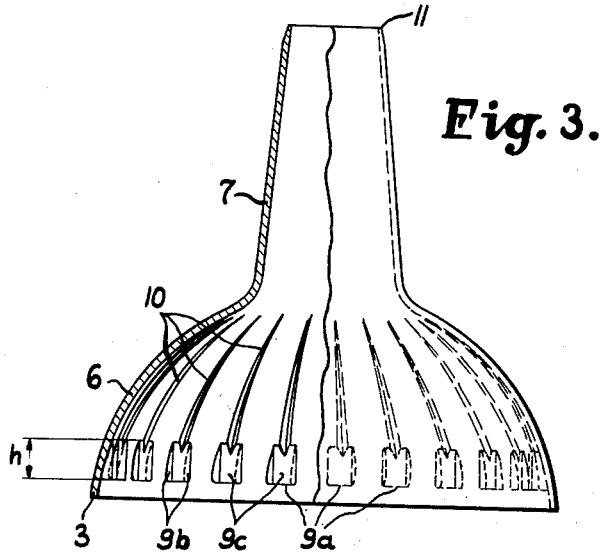
Figure 3 is a side elevation of a stamping out and sealing die of a modified construction, partly in section.
Figure 4:
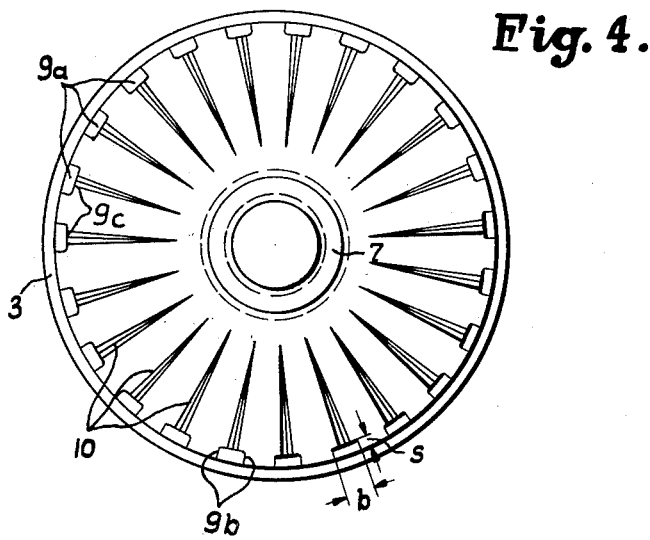
Figure 4 is a corresponding plan view from below.

In Figures 3 and 4 there is shown a particularly advantageous construction in which the cup 6 with the handle 7 is formed of one piece, the handle being formed as a tubular, preferably somewhat conical projection. The stamping out and sealing die shown in Figures 3 and 4 may, therefore, at the same time be used as a funnel. In this construction special air holes in the cup are not necessary as the air can escape from the top through the passage 8.

In this construction also, a pressure edge, which is interrupted and consists of numerous projecting parts in the form of noses having flat lower surfaces 9 provided on the inner surface of the cup, is provided at a distance from the stamping out edge 3. It can be seen that each part 9 includes a horizontal pressure surface or wall 9a and each surface 9a is parallel to but spaced from the peripheral edge 3 of the cup-like body 6. Also, the part 9 comprises two lateral vertical walls 9b, and a vertical front wall 9c.

The part 9 is relatively thin as indicated at s while the width dimension b is considerably greater, at least twice and the height h of each part is substantially greater and is a multiple of the dimension s. It should be stressed that the thinness s means that the damaging of the dough or the piercing of the upper dough layer is prevented.

The walls 9b and 9c are quite high and extend to the inner wall of the cup-like body 6 and the horizontal surface 9a serves to press the layers of dough together. The vertical walls or surfaces 9b and 9c facilitate an easy "sliding out" of the stamped dough thus serving to prevent the dough from "sticking" in the cup-like body during the molding process. Furthermore, as illustrated, reinforcing ribs 10 are provided on the inner surface of the cup, which are advantageously joined with the projecting parts 9, that is to say, form extensions of the parts 9. The ribs 10, together with the projections 9, provide the pastry with a decorative structure. In addition, the cup provided with ribs may be used as a fruit greater and for the extraction of fruit juice. Finally, the upper edge 11 of the tubular handle 7 is of thin-walled and/or blade-formed construction in such manner that it may be used for removing the cores from apples and the like.

The new stamping out and sealing die shown in Figures 3 and 4 is advantageously manufactured of artificial resin.

Figure 5:
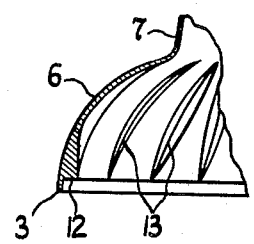
Figure 5 is part sectional elevation of a third modification of stamping out and sealing die according to the invention.

A further construction and/or modification of the construction illustrated in Figures 3 and 4 is shown in Figure 5, in which, at a distance from the stamping out edge 3, there is provided a closed annular pressure edge 12. Similar to the construction of Figures 3 and 4, ribs 13 may be provided on the inner surface of the cup. The ribs 13 form at the same time a reinforcement of the cup so that it may be provided of a relatively thin-walled construction, even if made of artificial resin.

Figure 5 illustrates the stamping out and sealing process according to which both pastry layers a and b, lying one on the other, are cut through by the stamping out edge 3, and the pastry edges are pressed together and thus joined. The filling is indicated at d.

I claim:

1. A device for stamping out and sealing together the two edges of filled pastry comprising an inverted cup-shaped body defining a dome-like hood, an outer peripheral cutting edge on the larger end of the body for stamping out the pastry, an upwardly projecting handle of hollow conical form secured to the smaller end of the dome-like hood and communicating with the interior of such hood, and means within the body and in proximity to the outer peripheral edge for pressing together the edges of the pastry, pressing the pastry together heightwise a substantial distance, and preventing the pastry from sticking in the cup-shaped body, such means being constituted by a plurality of spaced apart inwardly projecting parts on the body, each part including vertical side walls, a vertical end wall, said vertical side and end walls being of substantial height and extending to the inner wall of the dome-like hood, and a lower flat wall perpendicular to the end wall and spaced from the outer peripheral edge of the body in the direction of smaller end of the body whereby said lower flat walls press the edges of the pastry together at spaced apart intervals and the vertical side walls and end wall press the pastry together heightwise a substantial distance and serve to prevent the pastry from sticking in the cup-shaped body.

2. A device as defined in and claimed by claim 1 further characterized in that a triangular rib extends from the upper end of each of said parts and tapers gradually in the direction of the smaller end of the hood, said ribs being provided on the inner wall of the hood and defining means for decorating the outside of the pastry and also strengthening the hood.

3. A device as defined in and claimed by claim 1 further characterized in that the outer end of said handle is provided with a sharpened edge whereby the pastry may be additionally stamped out for decorative purposes.

4. A device for stamping out and sealing together the two edges of filled pastry comprising an inverted cup-shaped body defining a dome-like hood, an outer peripheral cutting edge on the larger end of the hood for stamping out the pastry, a plurality of spaced apart inwardly projecting elongated parts within the hood and in proximity to the outer peripheral edge at the larger end of the hood, each of said parts including laterally spaced vertical side walls, a vertical end wall, the vertical side and end walls being of substantial height and extending to the inner wall of the dome-like hood, and a lower flat wall perpendicular to the end wall and spaced from the outer peripheral edge of the hood in the direction of the smaller end of the hood, the lower flat walls serving to press the edges of the pastry together at spaced apart intervals and the vertical side walls and end walls pressing the pastry together heightwise a substantial distance and also preventing the pastry from sticking in the hood, and a triangular rib extending from the upper end of each of said parts toward the smaller end of the hood and tapering gradually in the direction of such smaller end, the ribs being provided on the inner wall of the hood and serving to decorate the outside of the pastry and strengthen the hood throughout its periphery.

5. A device as defined in and claimed by claim 4 further characterized in that each of said elongated parts and each of said triangular ribs is integrally formed with the inner wall of the dome-like hood.

References Cited in the file of this patent

UNITED STATES PATENTS

| Number | Name | Date |
|---|---|---|
| 170,888 | Noble | Dec. 7, 1875 |
| 2,214,475 | Napolillo | Sept. 10, 1940 |
| 2,373,182 | Gamache | Apr. 10, 1945 |